(12) United States Patent
Yamamoto et al.

(10) Patent No.: US 6,396,050 B1
(45) Date of Patent: May 28, 2002

(54) SELF-EMITTING OPTICAL PROBE, METHOD FOR PRODUCING THE SAME, AND SCANNING NEAR-FIELD OPTICAL MICROSCOPE

(75) Inventors: Noritaka Yamamoto; Hiroshi Muramatsu; Norio Chiba, all of Chiba; Katsunori Honma, Mihama-ku, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/497,012

(22) Filed: Feb. 2, 2000

(30) Foreign Application Priority Data

Feb. 5, 1999 (JP) .............................. 11-029227
Jan. 7, 2000 (JP) ....................... 2000-005934

(51) Int. Cl.⁷ .............................. H01J 3/14; H01J 5/16; H01J 40/14
(52) U.S. Cl. .................................. 250/216; 250/227.11
(58) Field of Search ........................... 250/216, 227.11, 250/305, 341.2

Primary Examiner—Robert H. Kim
(74) Attorney, Agent, or Firm—Adams & Wilks

(57) ABSTRACT

A self-emitting optical probe having a built-in light-emitting function, wherein the light-emitting mechanism and the aperture portion of the optical probe are formed by depositing an electrically conductive thin film, an organic thin film, and a metallic film by means of sputtering and oblique vacuum evaporation while rotating the core. The self-emitting optical probe enables an inexpensive scanning near field optical microscope yet simplified in operation.

37 Claims, 3 Drawing Sheets

F I G. 4
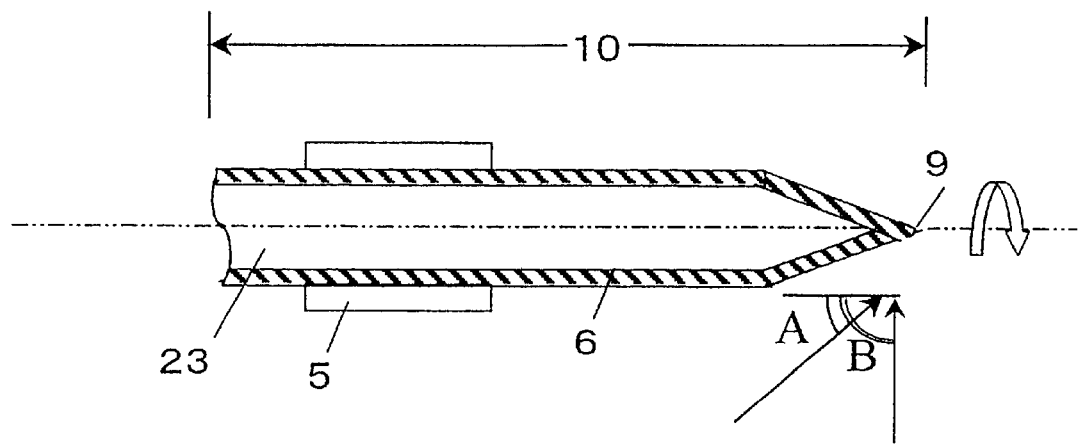
F I G. 5
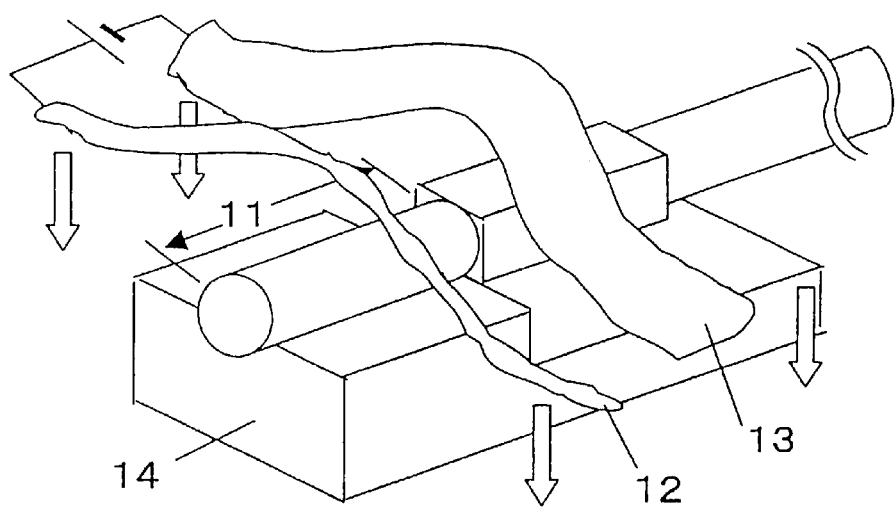

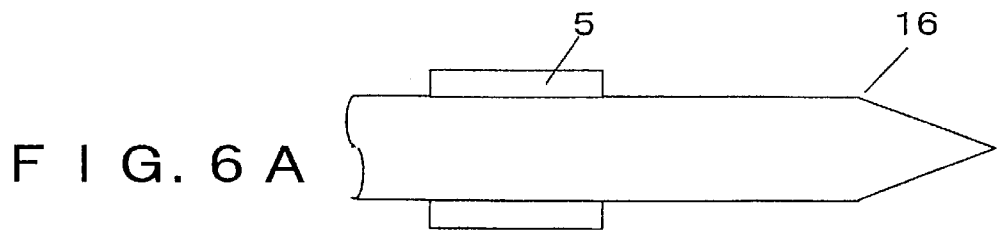
FIG. 6A
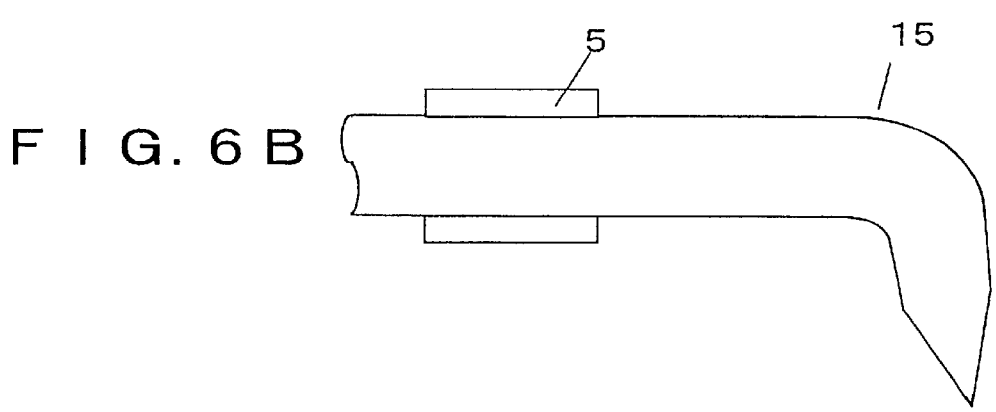
FIG. 6B
FIG. 7
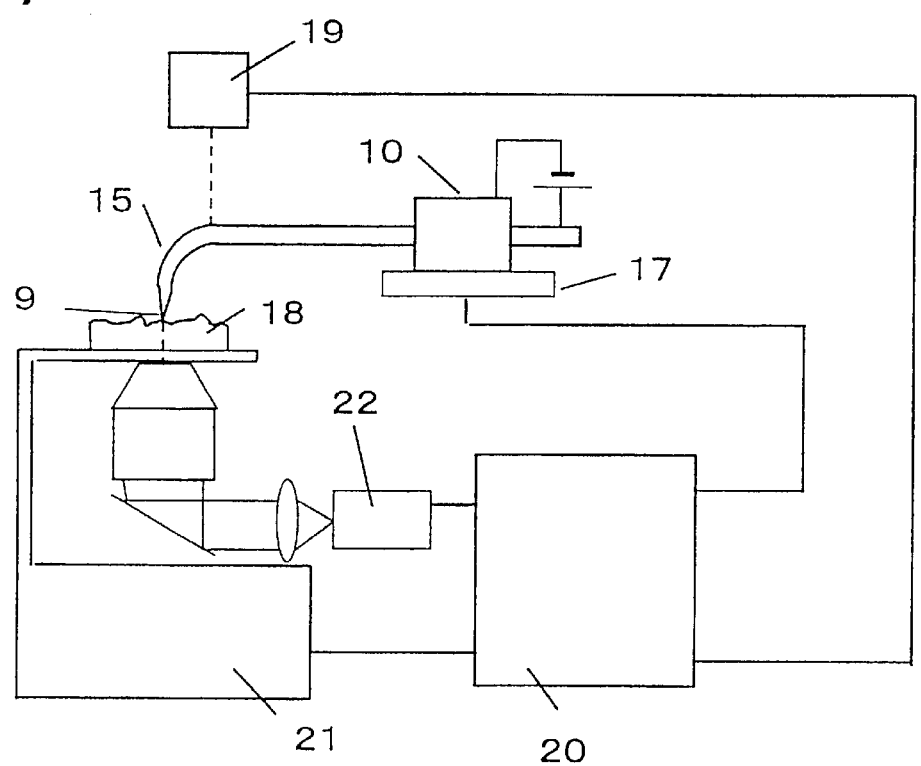

SELF-EMITTING OPTICAL PROBE, METHOD FOR PRODUCING THE SAME, AND SCANNING NEAR-FIELD OPTICAL MICROSCOPE

BACKGROUND OF THE INVENTION

The present invention relates to an optical probe to be incorporated in a scanning near field optical microscope (SNOM) which is used for the morphological observation of the specimen or for the measurement of optical properties in a nanometer region of a solid surface by irradiating light or by optical excitation of the surface of an object to be measured. The present invention also relates to a method for producing the optical probe and to a scanning near field optical microscope using the same.

Aperture type optical probes produced by coating a metal around sharpened glass capillaries or optical fibers have been reported heretofore. The advancements in micromachining technology have enabled the production of probes having a very acute front end portion and have led to the realization of a scanning near field optical microscope (sometimes referred to simply hereinafter as an "SNOM") capable of optical images with superior resolution power as compared with the conventional optical microscopes. Furthermore, the improvement in the precision of semiconductor processes has made it possible to produce optical waveguide optical probe chips of cantilever type.

However, in the case of the aperture type optical probes obtained to the present time, the light provided from an external light source must be introduced to a minute region of the specimen through the waveguide of the probe itself. To realize this, an operation of coupling the light to the fiber is required, and, moreover, an extremely complicated operation is necessary to handle a fine and brittle fiber amounting to a length of about 1 meter. Furthermore, in the case of optical waveguide optical probe chips of a cantilever size produced by a semiconductor process, the coupling of the light emitted from an external light source is so difficult that light leakage negatively influences the observation under the SNOM. In addition to this, the probe itself yields a low through put of light that an expensive laser with high power is required to be used as the external light source. Moreover, depending on the object, there are cases in which light with different wavelength is necessary, and in such cases, plural laser radiation sources capable of emitting the desired wavelengths must be provided separately. Because a laser radiation source emits a highly monochromatic light, it is necessary to convert the wavelength using a non-linear optical effect in order to comply with the requirement for a variety of light ranging over a wide wavelength; however, since the fiber itself poses limits in the wavelength of the transmitting light, the measurement of absorbance of the specimen under the SNOM, for example, is found unfeasible. In U.S. Pat. Nos. 5,546,223 and 5,105,305 by R. E. Betzig and U.S. Pat. No. 5,479,024 by Hillner are disclosed methods comprising placing a light emitting material in the front end of the probe chip and allowing the light-emitting material to emit light to use as a light source. However, these methods still required an external light source because photo excitation by using an external light source was used to realize the light emission of the light-emitting material.

SUMMARY OF THE INVENTION

According to a first aspect of the present invention, there is provided an optical probe having a field emitting function inside the optical probe as a means for solving the problem described above, and the optical probe is constructed by a thin film light emitting device. The optical probe can be produced by chemical etching, sputtering, vacuum evaporation, spin coating, and dipping. Thus, an inexpensive SNOM system is made feasible by using the optical probe of the present invention because an external light source and the optical system for light conversion can be eliminated this invention. Furthermore, an SNOM which can be used in the measurement of absorbance is made possible because the probes themselves are provided with the light emitting function. This enables the emission of plural lights differing in wavelength or a single light with a wide wavelength by properly selecting the organic material to be used therein. It is also possible to amplify the intensity of light by using a quartz rod, an optical fiber, or a hollow fiber for the core and thereby providing a cavity using the optical waveguide thereof. Since the optical probe itself emits light by simply applying voltage to the electrodes provided to the optical probe, the operability of the optical probe can be greatly improved; that is, it can be easily maneuvered in a manner similar to that of a cantilever used in AFM.

BRIEF DESCRIPTION OF THE DRAWINGS

FIG. 4 is a diagram showing the process for producing a self-emitting optical probe according to a fourth embodiment of the present invention;

FIG. 5 is a diagram showing the base of a self-emitting optical probe according to a fifth embodiment of the present invention and the structure of the attachment jig;

FIG. 6A is a schematic diagram showing a linear self-emitting optical probe, and FIG. 6B is a schematic diagram showing a hook-like self-emitting optical probe according to a sixth embodiment of the present invention; and FIG. 7 is a diagram showing the construction of a scanning near field optical microscope equipped with an optical probe according to a seventh embodiment of the present invention.

DETAILED DESCRIPTION OF THE PREFERRED EMBODIMENTS

Embodiments for practicing the present invention are described below with reference to the attached drawings. It should be understood, however, that the present invention is by no way limited thereto.

EXAMPLE 1

Figure 1:
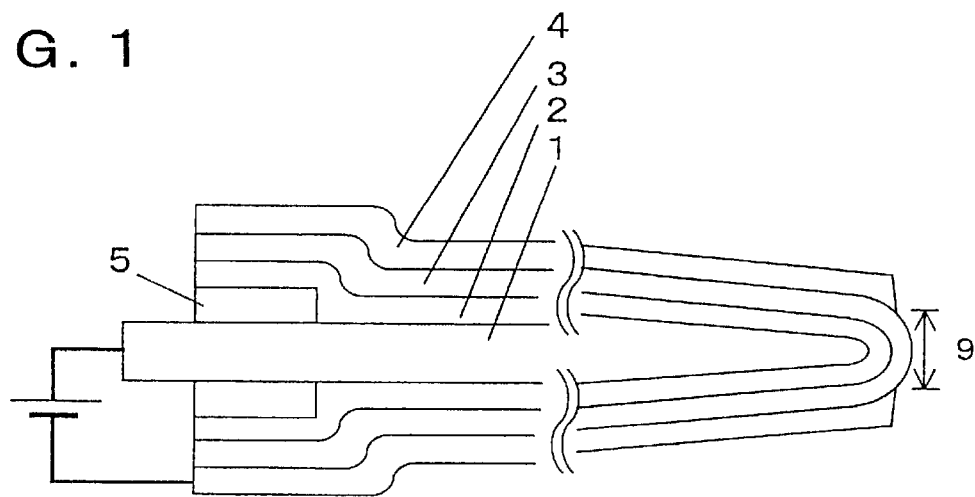
FIG. 1 is a cross section view of a self-emitting optical probe according to a first embodiment of the present invention.

FIG. 1 shows the cross section view of a self-emitting optical probe according to a first embodiment of the present invention. Referring to FIG. 1, a center metallic core 1 has a front end sharpened to a nanometer size. Organic materials which function as a hole transport layer 2 and an electron transport layer 3 are deposited as films around the center metallic core 1, and a metallic film 4 is further deposited on the outermost surface thereof. An aperture 9 having no metallic film deposited thereon is provided at the front end of the optical probe, and an insulating film 5 is provided on the other end. Usable as the center metallic core 1 are the metals suitable for lithographic process, such as PtIr, stainless steel, Inconel, etc. An aromatic diamine (TPD) is used as the hole transport layer 2 and an aluminum quinolinol complex (Alq) and the derivatives thereof, or a material having properties similar thereto is used as the electron transport layer 3. Aluminum (Al), gold (Au), etc., can be used for the metallic film 4. By applying a voltage between the center metallic core 1 used as the cathode and the metallic film 4 used as the anode, light can be emitted from the boundary between the hole transport layer 2 and the electron transport layer 3. The metallic film 4 provided at a thickness of about 100 nm functions as a cover to prevent the light from leaking in the direction of the film thickness when light is emitted. Because the light can proceed in the transverse direction of the organic film, the film walls function as the light waveguide, and the light can be taken out only from the fine aperture 9.

As described above, an optical probe free of an external light source can be realized by providing a light emitting function inside the optical probe. The front end of the optical probe is fabricated in such a manner that the both electrodes are not brought into contact with each other. That is, the structure is provided as such that front end of the center metallic core 1 is sharpened to a size of a nanometer, and such that the metallic film 4 is deposited on the entire structure except for the aperture 9 after the center metallic core 1 is completely covered with a hole transport layer 2 and the electronic transport layer 3. The other end of the optical probe is provided in such a structure that, an insulating film 5 is deposited before forming the hole transport layer 2, the electron transport layer 3, and the metallic film 4. In this case, the films are deposited in such a manner that at least the metallic film 4 may not be deposited on the center metallic core 1. Thus, the structure is provided such that the electrode portions (the center metallic core 1 and the metallic film 4) are separated from each other. In this manner, the optical probe can be easily fixed and interconnected by two wires which function as connection lines.

In the case of an optical probe using an ordinary optical fiber, the usable wavelength is limited by the fiber structure and the material constituting the fiber core portion which functions as the waveguide. In the case of the optical probe according to the present invention, the wavelength of the usable light depends on the organic material employed for the electron transport layer 3. In addition to an aluminum-quinolinol complex (Alq) and the derivatives thereof, an oxadiazole derivative and the like can be used for the electron transport layer 3. Furthermore, the organic materials may be used alone or used as a mixture thereof, or may be mixed with a polymer such as polymethyl methacrylate. By thus changing the constitution of the organic material, it is possible to vary the wavelength of the light emitted from the probe, or to produce a light having a broad wavelength by emitting radiations differing in wavelength at the same time. This enables the conventionally unfeasible measurement of absorbance by using the scanning near field optical microscope.

EXAMPLE 2

Figure 2:
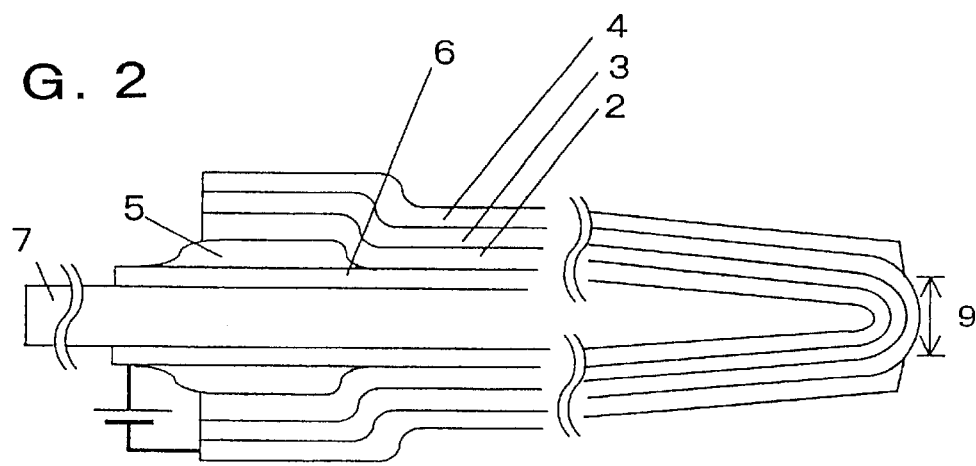
FIG. 2 is a cross section view of a self-emitting optical probe according to a second embodiment of the present invention.

FIG. 2 shows the cross section view of a self-emitting optical probe according to a second embodiment of the present invention. The present embodiment differs from that of the first embodiment of the present invention shown in FIG. 1. Referring to FIG. 2, a light waveguide 7 comprising a tapered front end which is sharpened to a nanometer size is provided at the center. Then, a transparent electrode 6 is formed by film deposition, and this portion functions as the electrode terminal in a manner similar to the core metal shown in FIG. 1. Similar to the construction shown in FIG. 1, a hole transport layer 2, an electron transport layer 3, and a metallic film 4 are formed on the outer side of the transparent electrode 6. The insulating film 5 shown in FIG. 1 is necessary in this case to be incorporated between the transparent electrode 6 and the metallic film 4 in order to prevent a short circuit from occurring when a connection is made to the probe. As a light waveguide 7, usable are a single mode optical fiber, a multimodal optical fiber, a hollow fiber, a quartz rod, etc. An ITO film and the like is used as the transparent electrode 6.

By providing the present optical probe with such a construction as described above, the function of the present optical probe differs from that of Example 1 in that the light radiated from the optical probe to a minute region reacts with the specimen, and that the light reflected or emitted from the specimen is taken outside by using again the light waveguide 7. That is, the so-called illumination-collection is made possible by using the optical probe alone without using any external light source. The same effects provided by the optical probe shown in FIG. 1 are also realized by the present optical probe.

EXAMPLE 3

Figure 3:
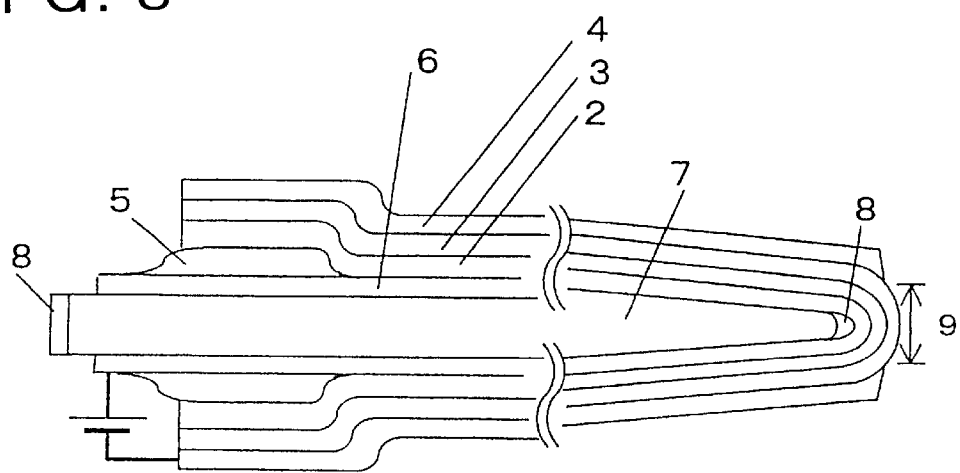
FIG. 3 is a cross section view of a self-emitting optical probe according to a third embodiment of the present invention.

FIG. 3 shows the cross section view of a self-emitting optical probe according to a third embodiment of the present invention. Similar to the optical probe shown in FIG. 2, the present construction referring to FIG. 3 comprises a light waveguide 7, a transparent electrode 6, a hole transport layer 2, an electron transport layer 3, and a metallic film 4, but it differs from FIG. 2 in that a dielectric mirror 8 is provided. As the dielectric mirror 8, $SiO_2$ and $TiO_2$ were deposited in turn each at a thickness corresponding to a quarter of the light-emitting wavelength of the organic material used for the electron transport layer 3, so as to obtain a mirror having a total thickness of 2 $\mu$m. By employing such a construction, the light emitted from the organic thin film around the optical fiber is transmitted through the transparent electrode 6, trapped inside the light waveguide 7, optically amplified by the dielectric mirror provided in the both ends of the light waveguide 7. Thus, a light having a high intensity can be obtained in case of taking out the light from the aperture. The other functions not referred to above are the same as those shown in FIGS. 1 and 2.

EXAMPLE 4

FIG. 4 shows the scheme of a method for producing a self-emitting optical probe according to a fourth embodiment of the present invention. Referring to FIG. 4, an optical fiber 23 having a front end sharpened to a nanometer size is fixed to an insulating film 5. For the method of sharpening the optical fiber, reference can be made to the disclosure in JP-A-Hei9-281123 (the term "JP-A-" as referred herein signifies "an unexamined published Japanese patent application"). First, a transparent electrode 7 was deposited over the entire optical probe 10 to a thickness of approximately 50 nm. Then, the insulating film 5 was deposited thereon except for a length about 3 nm from the end of the optical probe. The hole transport layer 2 was further formed thereon to a thickness of about 50 nm by means of vacuum evaporation from a direction making an angle B shown in the figure while rotating the optical probe 23 around the axis of thereof. The electron transport film 3 was formed by a similar method to a thickness of about 50 nm. The films were deposited by making approximately a right angle B with respect to the axis of the optical probe in order to cover the entire probe, inclusive of the front end portion, with the hole transport layer 2 and the electron transport film 3, such that the films were deposited concentrically around the probe axis. In this manner, and by finally depositing the metallic film 4, the resulting structure was obtained free from exposed portions of the electrode, and short circuiting was prevented from occurring in case of using the resulting structure as the optical probe. The metallic film 4 provided as the outermost layer was deposited by vacuum evaporation from a direction of an angle A with respect to the optical probe as shown in the figure. By thus providing a portion free of a metallic film 4 in this manner, an aperture 9 was formed on the front end portion. On depositing the metallic film 4, the portion behind the jig was masked in order to obtain the portion free of the metallic film 4. In this manner, the final optical probe can be attached to a casing by easily assuring the connection with the electrode, while preventing a short circuit from occurring between the electrodes, similar to the case of the front end.

EXAMPLE 5

FIG. 5 shows the base of a self-emitting optical probe according to a fifth embodiment of the present invention and the structure of the attachment jig. Referring to FIG. 5, a transparent electrode 7 provided to the base layer is exposed because a metallic film 4 is not deposited on the portion (about 3 mm in length) behind the insulating film 11. In contrast to this, a metallic film 4 is deposited on the surface of the probe corresponding to the front portion inclusive of the insulating film 5. Downward tension is applied to the plus electrode wire 12 and the minus electrode wire 13 in such a manner that, when the optical probe is not attached, the base 14 is pressed downward. The base 14 is made electrically insulating, and an optical probe can be fixed between the wires and the base 14 by accommodating the optical probe into the space that forms by relaxing the wires.

EXAMPLE 6

FIGS. 6(A) and 6(B) show schematically the self-emitting optical probe according to a sixth embodiment of the present invention. In FIGS. 1 to 4, a straight linear optical probe 16 as shown in FIG. 6(A) and the process for producing the same are shown. It is also possible to realize a hook-like optical probe 15 shown in FIG. 6(B) in accordance with the optical probe having a light-emitting function of the present invention by a similar process described above, but a hook-like optical probe 15 is used in a SNOM of a type in which the front end of the optical probe is controlled to oscillate in a direction vertical to the specimen or in which the optical probe is controlled in accordance with the upward and downward movement of the probe front end that is detected by the bent of the probe. Concerning the production method of the optical probe, it differs from that for a linear optical probe 16 in that it requires an additional step of bending the probe. In the present example, the process for producing a hook-shaped optical probe 15 is described below.

Firstly, a sharpened optical probe was bent into a hook-like shape by a thermal means, such as converging radiation emitted from a $CO_2$ laser. The method therefor is disclosed in JP-A-Hei9-281123. Subsequent thereto, a film of a transparent electrode 6 was formed over the entire probe by means of sputtering, and films of a hole transport layer 2, an electron transport film 3, and a metallic film 4 are formed by means of vacuum evaporation in accordance with the production method described referring to FIG. 4. There is no particular difference between the present production process and the process for producing a linear optical probe 16, except that the production is proceeded in steps by taking the bent front as the axis. The difference in effect as compared with that of a linear optical probe 16 is, as described above, that the optical probe is used by mounting it in a SNOM of a different type. Since a SNOM using a hook-like optical probe 15 enables sweeping the optical probe in contact with the specimen, it is possible to observe the friction force or the distribution image of viscoelasticity in the surface of the specimen.

EXAMPLE 7

FIG. 7 shows schematically an SNOM equipped with an optical probe according to a seventh embodiment of the present invention. A hook-like optical probe 15 shown in FIG. 6(B) is set on a bimorph provided as an oscillating means to oscillate the front end of the hook-like optical probe 15 vertically with respect to a specimen 18, so as to detect, by means of a displacement detection means 19, the atomic force functioning between the front end of the optical probe 15 and the surface of the specimen 18 or a force related to any mutual reaction as a change in oscillating characteristics. At the same time, the distance between the front end of the hook-like optical probe 15 and the surface of the specimen 18 is maintained constant by controlling it with a control means 20 while measuring the surface morphology of the specimen by scanning the specimen using a XYZ transport means 21. In this construction, light is irradiated locally to a fine region of the specimen 18 from the aperture 9 by applying voltage to the electrodes of the hook-like optical probe 15, and thus the optical characteristics of the fine region can be measured simultaneously by detecting the light resulting from the mutual reaction with the specimen by means of a photon detection means 22 for measuring the optical characteristics. In FIG. 7 is shown a constitution of a transmitting type, i.e., a constitution in which the measuring light is detected at the back side of the specimen 18, but it is possible to employ a constitution of a reflection type in which the measuring light is detected on the surface of the specimen; otherwise, by using an optical probe having the structure shown in FIG. 2, a constitution in which the optical probe itself detects the light is also available. In general, a photo cantilever is used as a displacement detection means 19, but an optical probe equipped with a piezoelectric device can be used in the place of the displacement detection means 19.

Furthermore, in the place of the oscillating hook-like optical probe 15 employed in the device constitution shown in FIG. 7, there can be used a constitution as such in which the bimorph 17 is not oscillated, or the bimorph 17 may be removed, so that the device may be used as an AFM operating in a contact mode.

It is also possible to perform measurements in liquid by providing a liquid reservoir cover to the devices above in such a manner that the probe and the specimen are maintained inside a liquid.

Thus, the present invention can be realized in the embodiments described above, and it provides the following effects.

An inexpensive scanning near field optical microscope system can be realized by providing a built-in field light-emitting function to the optical probe, because an external light source and an optical system for converging light to the optical fiber can be eliminated.

Because the probe itself is equipped with a light-emitting function, a probe capable of emitting lights plural differing in wavelength or a light having a broader region in wavelength can be produced by properly selecting the organic material. This enables a scanning near field optical microscope capable of performing the measurement of absorbance. By using a quartz rod or an optical fiber in the center of the probe and by fabricating a cavity using their light waveguide, the intensity of the light can be amplified. Thus, the operability of the entire system is far improved because it is possible to simplify the operation of the optical probe to a level comparable to a cantilever employed in AFM.

While the invention has been described in detail by making reference to specific embodiments, it should be understood that various changes and modifications can be made without departing from the scope and the spirit of the present invention.

What is claimed is:

1. A self-emitting optical probe comprising: an optical waveguide having a fine aperture at a front end thereof for use in a scanning near field optical microscope; and light-emitting means for emitting light from the fine aperture, the light-emitting means being contained in the optical waveguide.

2. A self-emitting optical probe according to claim 1; wherein the optical waveguide comprises an electrically conductive core having a sharpened front ends, an organic thin film covering the core, and a metallic film covering the organic thin film but not covering the core at the aperture; wherein the organic thin film layer emits light in response to a voltage applied between the electrically conductive core and the metallic film.

3. A self-emitting optical probe according to claim 2; wherein the electrically conductive core comprises an electrically conductive film deposited on one of an elongated metal member or an optical waveguide.

4. A self-emitting optical probe according to claim 3; wherein the optical waveguide has a core comprising one of a quartz rod, a hollow fiber, and an optical fiber.

5. A self-emitting optical probe according to claim 3; wherein the electrically conductive core comprises an electrically conductive transparent thin film formed of a light-transmitting material and serves as an electrode of the light-emitting means.

6. A self-emitting optical probe according to claim 2; wherein the organic thin film has a stacked structure comprising a photoconductive material having a large hole mobility deposited on an inner side facing the core and a photoconductive material having a large electron mobility on an outer side facing the metallic film.

7. A self-emitting optical probe according to claim 1; wherein the optical waveguide probe comprises an optical resonator and has dielectric mirrors on opposite edge planes thereof.

8. A self-emitting optical probe according to claim 5; wherein the metallic film of the optical waveguide is deposited over a smaller area of the electrically conductive core than that covered by the electrically conductive transparent thin film, and an insulating film disposed between a portion of the metallic film and the transparent thin film, the metallic film and the transparent thin film are both serving as electrodes of the light-emitting means so that a light is produced by the organic thin film disposed therebetween when a voltage is applied between the metallic thin film and the transparent thin film.

9. A self-emitting optical probe according to claim 4; wherein the core comprises an optical fiber having a core portion for picking up light from outside of the aperture so that the optical waveguide is capable of operating in an illumination-collection mode to emit light produced by the light-emitting means and to collect light from outside the probe through the optical fiber.

10. A self-emitting optical probe according to claim 4; wherein the core comprises a quartz rod for picking up light from outside of the aperture so that the optical waveguide is capable of operating in an illumination-collection mode to emit light produced by the light-emitting means and to collect light from outside the probe through the quartz rod.

11. A self-emitting optical probe according to claim 4; wherein the core comprises a hollow fiber for picking up light from outside of the aperture so that the optical waveguide is capable of operating in an illumination-collection mode to emit light produced by the light-emitting means and to collect light from outside the probe through the hollow fiber.

12. A self-emitting optical probe according to claim 2; wherein the organic thin film comprises a multiple wavelength light emitting material comprising one of a combination of organic materials for emitting light of different colors and being arranged in one of a stacked structure and which emit light of different colors, or a combination of mixtures of the organic materials.

13. A self-emitting optical probe according to claim 1; wherein the light-emitting means and the aperture portion are fabricated by depositing an electrically conductive thin film on an electrically conductive core, depositing a light-producing organic thin film onto the electrically conductive thin film, and depositing a metallic thin film on the organic thin film except for a small portion at one end of the core so as to form the aperture portion, the thin films being deposited by at least one of sputtering and oblique vacuum evaporation while rotating the core.

14. A self-emitting optical probe according to claim 2; wherein the organic thin film is deposited by one of vapor evaporation, spin coating and dipping.

15. A scanning near field optical microscope having a self-emitting optical probe according to claim 1 for measuring the morphology of a specimen by two-dimensionally scanning the surface of the specimen using the probe while bringing the front end portion of the probe in close proximity to the specimen surface so that an atomic force or another mutual force can be exerted onto the front end portion of the probe and controlling the probe to move along the morphology of the specimen, the scanning near field optical microscope further comprising oscillation means for oscillating the front end of the probe in a horizontal direction or in a vertical direction relative to the surface of the specimen; detection means for detecting the oscillation width of the probe; and control means for maintaining the distance between the front end portion of the probe and the surface of the specimen constant based on the detection signal output from the detection means.

16. A scanning near field optical microscope having a self-emitting optical probe according to claim 1 for measuring the morphology of a specimen by two-dimensionally scanning the surface of the specimen using the probe while bringing the front end portion of the probe in close proximity to the specimen surface so that an atomic force or another mutual force can be exerted onto the front end portion of the probe controlling the probe to move along the morphology of the specimen, and at the same time irradiating light or applying optical detection to a minute region of the specimen surface, the scanning near field optical microscope further comprising oscillation means for oscillating the front end of the probe in a horizontal direction or in a vertical direction relative to the surface of the specimen; detection means for detecting the oscillation width of the probe; and control means for maintaining the distance between the front end portion of the probe and the surface of the specimen constant based on the detection signal output from the detection means.

17. A scanning near field optical microscope having a self-emitting optical probe according to claim 1 for measuring the morphology of a specimen by two-dimensionally scanning the surface of the specimen using the probe while bringing the front end portion of the probe in close Proximity to the specimen surface so that an atomic force or another mutual force can be exerted onto the front end portion of the probe and controlling the probe to move along the morphology of the specimen, the scanning near field optical microscope further comprising displacement detection means for detecting displacement of the probe; and control means for maintaining the distance between the front end portion of the probe and the surface of the specimen constant based on the detection signal output from the detection means.

18. A scanning near field optical microscope having a self-emitting optical probe according to claim 1 for measuring the morphology of a specimen by two-dimensionally scanning the surface of the specimen using the probe while bringing the front end portion of the probe in close proximity to the specimen surface so that an atomic force or another mutual force can be exerted onto the front end portion of the probe and controlling the probe to move along the morphology of the specimen, and at the same time irradiating light or applying optical detection to a minute region of the surface, the scanning near field optical microscope further comprising displacement detection means for detecting displacement of the probe; control means for maintaining the distance between the front end portion of the probe and the surface of the specimen constant based on the detection signal output from the detection means; and torsion detection means for detecting torsion of the probe.

19. A self-emitting optical probe according to claim 2; wherein an interface between the organic thin film and the metallic film serves as a waveguide for light generated by the organic thin film.

20. A self-emitting optical probe according to claim 2; wherein the core comprises a non-transparent material.

21. A self-emitting optical probe according to claim 20; wherein the core comprises a metallic material.

22. A self-emitting optical probe according to claim 2; wherein the core comprises one of a quartz rod, a hollow fiber, and an optical fiber coated with a conductive film.

23. A self-emitting optical probe according to claim 2; wherein the core comprises a transparent optical waveguide and a conductive film formed thereon.

24. A self-emitting optical probe according to claim 23; wherein the conductive film comprises a transparent conductive film.

25. A self-emitting optical probe according to claim 2; wherein the core comprises one of PtIr, stainless steel and Iconel.

26. A self-emitting optical probe according to claim 2; wherein the organic thin film comprises a hole transport layer and an electron transport layer.

27. A self-emitting optical probe according to claim 26; wherein the hole transport layer comprises aromatic diamine.

28. A self-emitting optical probe according to claim 26; wherein the electron transport layer comprises an aluminum quinolinol complex.

29. A self-emitting optical probe according to claim 2; wherein the metallic film is formed of one of aluminum and gold.

30. An optical probe comprising: an elongated core; a light-emitting layer comprising a light-emitting substance formed on the core; and a light containment layer formed on the light-emitting layer, so that light emitted by the light-emitting layer is projected transversely across the elongated core.

31. An optical probe according to claim 30; wherein the elongated core is formed of a metal.

32. An optical probe according to claim 30; wherein the light-emitting substance is responsive to a voltage applied thereacross to generate light and the light is projected transversely along the length of the elongated core and emitted from an opening in the light containment layer.

33. An optical probe according to claim 32; wherein the core and the light containment layer are conductive and serve as electrodes for applying the voltage across the light-emitting layer.

34. An optical probe according to claim 30; further comprising a fine aperture portion formed at an end of the core through which light may pass.

35. An optical probe according to claim 30; wherein the light-emitting layer comprises a stacked structure having at least one layer of a photoconductive material having a large hole mobility and at least one layer of another photoconductive material having a large electron mobility.

36. An optical probe according to claim 30; wherein an interface between the light-emitting layer and the light containment layer serves as a waveguide for light generated by the light-emitting layer.

37. A light-emitting scanning probe for a scanning probe instrument, comprising: an optical waveguide having a fine aperture formed at an end thereof through which light may pass; wherein the optical waveguide has an electrically conductive core portion, a light-emitting film formed on the core portion, and a light containment film formed on the light-emitting film the light-emitting film being responsive to a voltage applied thereacross to generate a light and emit the light from the aperture.

* * * * *